No. 881,653. PATENTED MAR. 10, 1908.
R. C. BENDER.
OYSTER CARRIER.
APPLICATION FILED MAY 10, 1907.
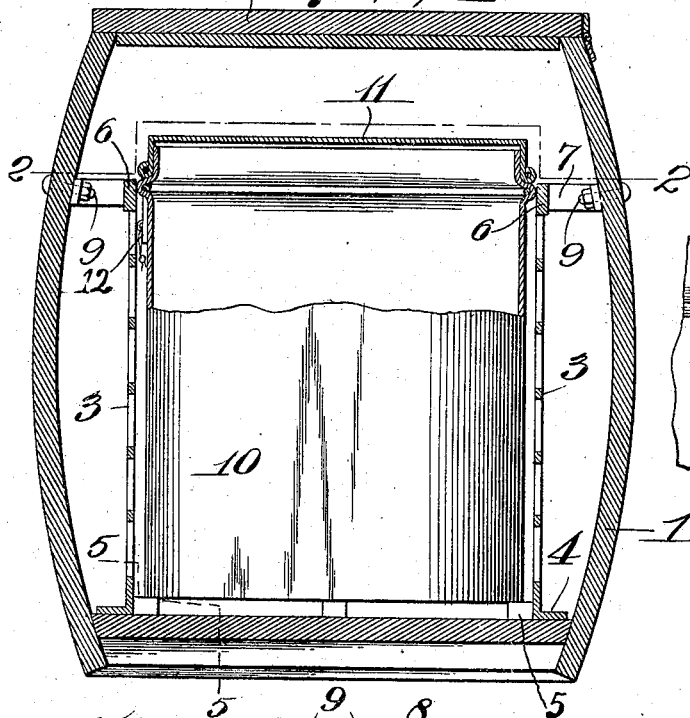
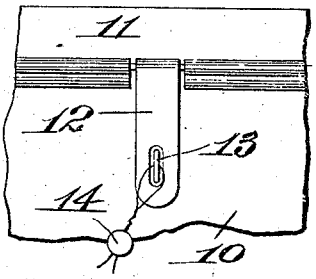
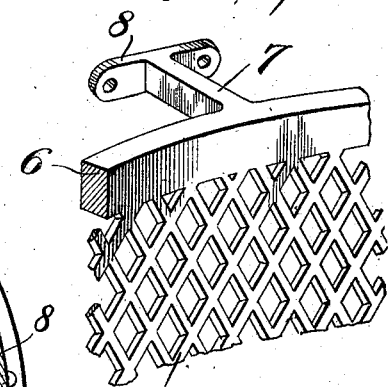
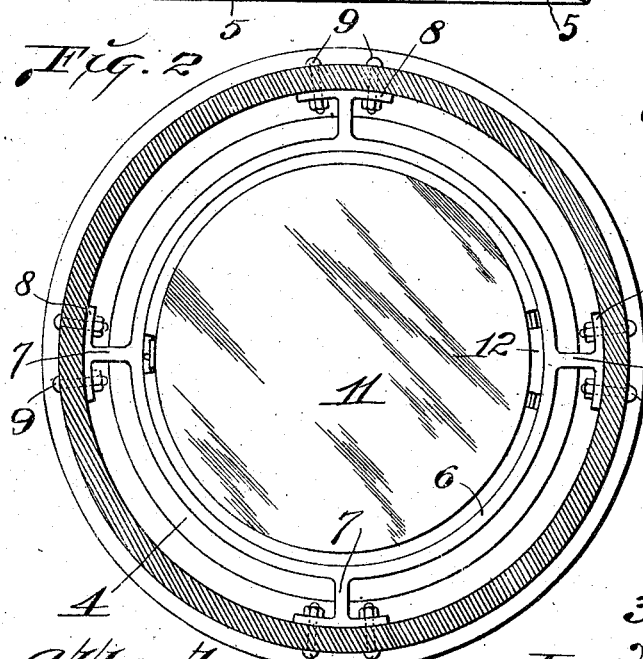
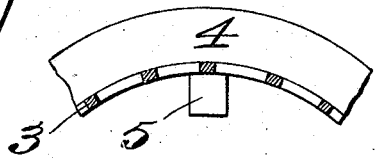
Attest,
Edgar J. Farmer.
M. P. Smith.
Inventor,
Robert C. Bender,
By Higdon & Longan Attys

UNITED STATES PATENT OFFICE.

ROBERT C. BENDER, OF ST. LOUIS, MISSOURI.

OYSTER-CARRIER.

No. 881,653.   Specification of Letters Patent.   Patented March 10, 1908.

Application filed May 10, 1907. Serial No. 372,964.

*To all whom it may concern:*

Be it known that I, ROBERT C. BENDER, a citizen of the United States, and resident of St. Louis, Missouri, have invented certain new and useful Improvements in Oyster-Carriers, of which the following is a specification containing a full, clear, and exact description, reference being had to the accompanying drawings, forming a part hereof.

My invention relates to an oyster carrier, and the object of my invention is to provide a simple, inexpensive, and compact package and carrier wherein a suitable receptacle is equipped so as to rigidly and conveniently hold an oyster receptacle, and there being an annular space between the container and the receptacle in which ice may be packed to refrigerate and keep the contents of the receptacle while the package and carrier is in storage and transit.

To the above purposes, my invention consists in certain novel features of construction and arrangement of parts, which will be hereinafter more fully set forth, pointed out in the claims, and illustrated in the accompanying drawings, in which:—

Figure 1 is a vertical section taken through the center of a carrier of my improved construction, with the inner receptacle partly in elevation; Fig. 2 is a horizontal section taken on the line 2—2 of Fig. 1; Fig. 3 is a detail elevation of a portion of the top of the oyster receptacle, and showing a hasp thereon; Fig. 4 is a perspective view of a portion of a perforated wall, which is rigidly fixed within the carrier and in which the oyster receptacle is located; Fig. 5 is an enlarged horizontal section taken on the line 5—5 of Fig. 1.

Referring by numerals to the accompanying drawings:—1 designates the outer member of the carrier, which is preferably constructed of wood, and in the form of a short keg, the upper end of which is closed by a hinged lid 2. Concentrically arranged within this outer member is a vertically disposed, circular wall 3 which is perforated; and formed integral with the lower end of said wall is an outwardly projecting flange 4, which rests upon the bottom of the member 1.

Formed integral with the lower end of the wall, and projecting inwardly therefrom, is a series of lugs 5, upon which rest the bottom of the oyster receptacle when the same is placed in position within the carrier. Formed integral with the top of the wall 3 is a ring 6, with which is formed integral a plurality of outwardly projecting arms 7; and formed integral with the outer ends of said arms are perforated ears 8, which receive bolts 9 that pass through the wall of the member 1, thus rigidly maintaining the circular wall 3 in proper position.

10 designates the oyster receptacle, which is preferably constructed of sheet metal in cylindrical form, and provided with a hinged lid 11; and said receptacle being of such size as that it readily fits within the circular wall 3, and projects slightly above the ring 6. When properly positioned within the wall 3, the bottom of the receptacle 10 rests on the lugs 5, thus forming a space beneath said receptacle, through which cold air or water may freely circulate.

The lid 11 is provided with a hasp 12, which is slotted in the usual manner, and receives a staple 13 carried by the receptacle 10; and, when the receptacle has been filled with oysters, the lid is sealed by passing a seal 14, of any ordinary construction, through the staple 13 after the hasp 12 has been engaged thereon. When the receptacle 10 is filled with oysters, sealed, and placed in position within the perforated wall 3, the space between said wall 3 and the wall of the member 1 is packed with ice, and ice is also placed on top of the receptacle 10; and the carrier is now ready for transit. During transit, the oyster receptacle 10 is rigidly held in a central position with the member 1; and, when so arranged, the perforated wall 3 prevents the ice from coming in direct contact with the wall of the receptacle, and cool air is free to circulate around the receptacle 10, and above and below the same.

A carrier so constructed is simple, inexpensive, comprises a minimum number of parts, can be conveniently handled, is easily re-iced while in transit, and the oyster receptacle can be easily removed, even while the carrier is packed with ice.

A particularly advantageous feature of my improved carrier is that the oyster receptacle can be easily and quickly removed from its position in the outer receptacle, and a part of its contents removed by salesmen, or other authorized persons, after which said oyster receptacle can be readily placed in position within the perforated wall, thus doing away with the necessity of repacking the ice in the space between the perforated wall and the outer receptacle.

I claim:—

1. An oyster carrier, comprising a receptacle, a lid normally closing the upper end thereof, a perforated wall concentrically arranged within the receptacle, lugs integral with the upper end of the perforated wall, ears integral with the lugs, which ears engage against and are fixed to the wall of the receptacle, a flange integral with and projecting outwardly from the lower end of the perforated wall, lugs integral with and projecting inwardly from the lower end of the perforated wall, and an oyster receptacle removably positioned within the perforated wall.

2. The combination with a receptacle, of a perforated wall concentrically arranged within the receptacle, a ring integral with the upper end of the perforated wall, lugs integral with said ring, the outer ends of which lugs are fixed to the wall of the receptacle, a horizontally disposed flange integral with and projecting outward from the lower end of the perforated wall, lugs integral with and projecting inward from the lower end of the perforated wall, and a receptacle removably positioned within the perforated wall and with its lower end resting on the lugs.

In testimony whereof, I have signed my name to this specification, in presence of two subscribing witnesses.

ROBERT C. BENDER.

Witnesses:
M. P. SMITH,
E. L. WALLACE.